United States Patent [19]

Summerfield

[11] Patent Number: 5,440,490
[45] Date of Patent: Aug. 8, 1995

[54] AIRCRAFT ENGINE EMERGENCY CONTROL SYSTEM

[75] Inventor: Leslie R. Summerfield, Bristol, England

[73] Assignee: Rolls-Royce plc, London, England

[21] Appl. No.: 154,081

[22] Filed: Nov. 18, 1993

[30] Foreign Application Priority Data

Nov. 20, 1992 [GB] United Kingdom ............... 9224330

[51] Int. Cl.[6] ................ B64D 39/00; B64D 37/00
[52] U.S. Cl. ................ 364/431.02; 364/431.01; 364/431.04; 60/39.281; 60/39.01; 60/39.59; 60/243
[58] Field of Search .............. 364/431.01–431.12, 364/442; 60/39.01–39.59, 243, 39.281

[56] References Cited

U.S. PATENT DOCUMENTS

| | | | |
|---|---|---|---|
| 4,134,257 | 1/1979 | Riple | 60/39.281 |
| 4,551,972 | 11/1985 | Lewis | 60/39.281 |
| 4,718,229 | 1/1988 | Riley | 60/39.281 |
| 4,793,133 | 12/1988 | White et al. | 60/39.281 |
| 4,794,755 | 1/1989 | Hutto, Jr. et al. | 60/39.281 |
| 4,821,193 | 4/1989 | Barber et al. | 364/431.02 |
| 5,076,048 | 12/1991 | Boston | 60/243 |
| 5,083,277 | 1/1992 | Shutler | 364/431.02 |

FOREIGN PATENT DOCUMENTS 2128773 5/1984 United Kingdom .

*Primary Examiner*—Kevin J. Teska
*Assistant Examiner*—Jacques H. Louis-Jacques
*Attorney, Agent, or Firm*—Oliff & Berridge

[57] ABSTRACT

In the event of incipient engine speed or loss of normal engine control fuel flow rate in a jet engine is limited by a speed governor. A speed governor arrangement with optionally selectable emergency speed control is described. Maximum engine speed limits are stored in ROM and compared with sensed values. When an overspeed threshold is reached an output is produced to reduce fuel flow rate. If normal engine control is lost an alternative governor mode can be selected in which a second fuel flow rate is read from ROM as determined by the pilot's speed lever setting. A lowest wins circuit selects the lower of this emergency control or the governor limit signal to drive the fuel metering unit.

10 Claims, 2 Drawing Sheets

AIRCRAFT ENGINE EMERGENCY CONTROL SYSTEM

BACKGROUND OF THE INVENTION

1. Field of the Invention

The invention relates to an aircraft engine control system. In particular, the invention concerns an emergency engine control system which will be found especially useful in single engine installations.

2. Description of the Prior Art

The invention is particularly concerned with control of jet engines. The normal engine control system utilises a system of monitoring engine performance and generating necessary control inputs to maintain certain engine parameters within predetermined limits. The main areas of control are shaft speeds and exhaust gas temperature. The most recent types of control system employing microprocessors and the like evaluate sophisticated steady state and transient control functions and are able to exercise control over a greater number of operating variables within the engine. Basically, should any of the monitored variables approach the limits of safe operation fuel flow is reduced to maintain shaft speed or gas temperature at a safe level.

Over and above this level of safe control there is normally provided a separate overspeed governor which is independent in its operation. Its sole purpose is to prevent the engine exceeding a maximum safe speed. Thus, in the event of control system malfunction the governor may be relied on to preserve engine integrity. Consequently the control system can be designed with a fail-safe mode which allows fuel supply level, and therefore engine speed, to increase. It is considered preferable for aircraft safety to permit engine thrust to increase in the event of control system failure rather than shutting down the engine. Although multi-engined aircraft can be flown safely with one engine stopped it is not generally a viable option for a signal-engined aircraft.

SUMMARY OF THE INVENTION

In circumstances where an engine itself remains serviceable but normal control is lost, the present invention seeks to provide an emergency control system capable of providing rudimentary control.

According to the present invention there is provided an aircraft engine control system comprising:
- engine speed or thrust demand signal generating means,
- a main engine control unit connected to receive said speed or thrust demand signal and to compute in accordance with normal operating schedules a permissible fuel level signal commensurate with said thrust demand and further signals relating to current engine performance,
- engine speed governor means operable in the event of failure of malfunction of the main engine control unit to generate an emergency fuel level signal, and
- an emergency control system selectively operable to connect the engine speed demand signal to modify the output of the engine speed governor means to produce a predetermined a fuel level signal in accordance with a measured engine speed signal and the demanded engine speed signal.

BRIEF DESCRIPTION OF THE DRAWINGS

The invention and how it may be carried out in practice will now be described in more detail with reference to a specific embodiment illustrated in the accompanying drawings, in which.

DETAILED DESCRIPTION OF THE DRAWINGS

Figure 1:
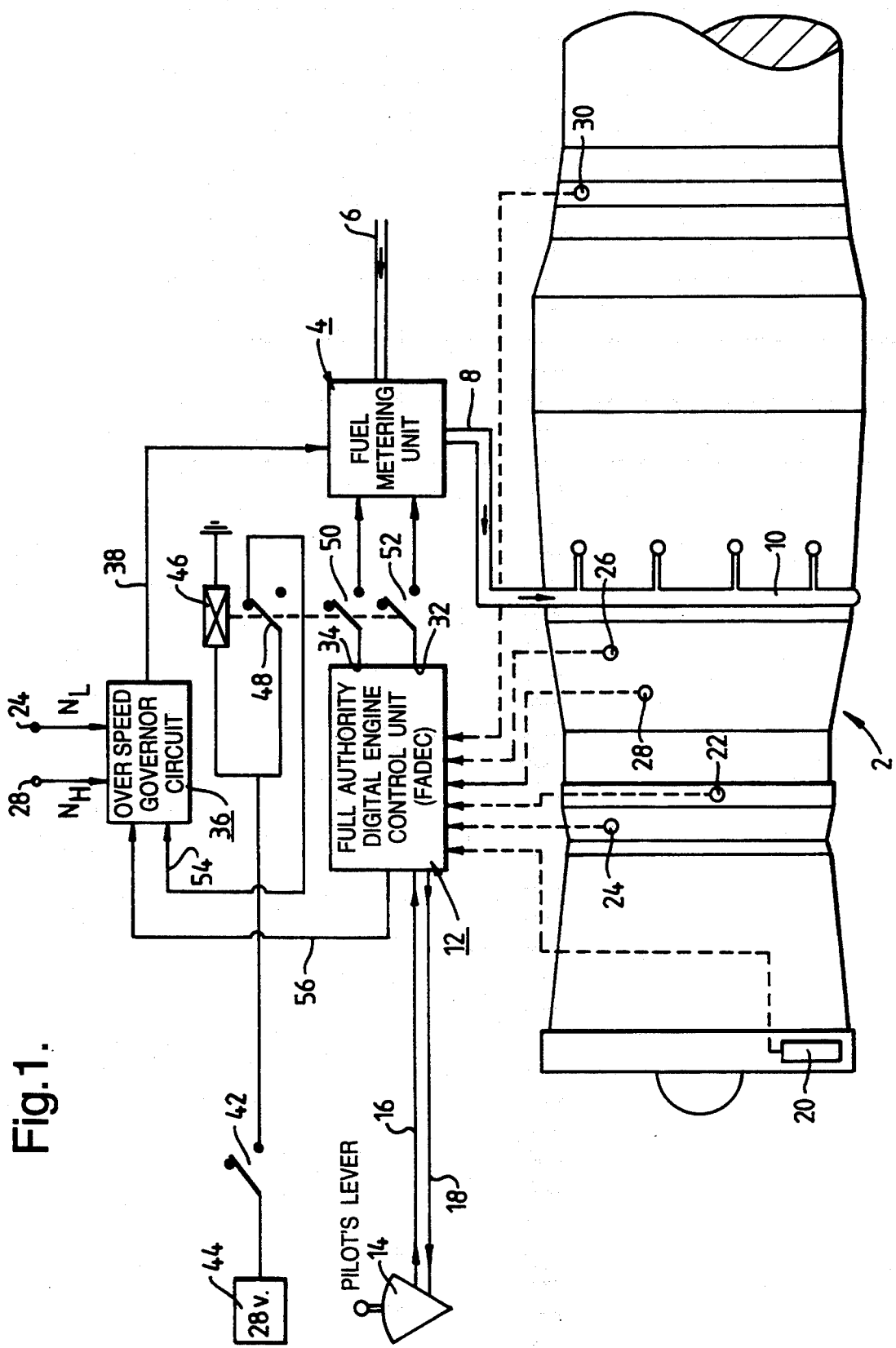
FIG. 1 shows in schematic form a jet engine and its engine control system including an overspeed governor modified to provide emergency control.

In the drawings, FIG. 1 shows a single jet engine and control system. Details of the aircraft and all other aircraft systems are omitted for the sake of clarity. The engine is illustrated in schematic outline at 2, and includes a fuel metering unit 4 which receives a supply of fuel on line 6 and delivers it at a regulated flow rate on line 8 to fuel manifold 10 in the engine.

The fuel metering unit 4 is controlled by a full authority digital engine control unit (hereinafter FADEC) 12. Although represented by a single function block in the drawing, in practice, unit 12 comprises two parallel control units each receiving its own inputs and generating it own outputs. In normal operation one or the other of these control units exercises engine control at the pilot's choice. In the event of a fault developing in the selected unit the pilot can switch control to the other unit.

A pilot's lever 14, by means of which the pilot commands engine thrust or speed, is interconnected with FADEC 12 through connections 16,18. Basically the lever 14 controls the position of a rheostat slider. The FADEC 12 provides supply voltage to the rheostat on connection 18 and receives the pilot's speed demand through return connection 16.

FADEC unit 12 also receives a plurality of inputs monitoring engine performance and condition from sensors on the engine. For example: sensor 20 monitors intake air temperature, sensor 22 LP shaft speed, sensor 24 HP compressor inlet pressure, sensor 26 HP compressor delivery pressure, sensor 28 HP shaft speed and sensor 30 monitors exhaust gas temperature. The FADEC units produce control outputs at 32,34 which are connected to fuel metering unit 4. The control system as thus far described is constructed and operates in accordance with known designs and principles. In addition as mentioned above an overspeed governor circuit 36 is connected in a supervisory capacity. It receives monitor inputs from the LP shaft and HP shaft speed sensors 24,28 and generates a supervisory output 38 connected to an override signal input in fuel metering unit 4.

To avoid interference with normal engine operation the intervention threshold of governor circuit 36 is set a little beyond normal maximum speed. In the event of either of the shaft speed signals reaching a predetermined level in excess of normal operating maximum, the governor 36 generates a signal at its output 38 which is operative to limit the fuel flow rate delivered by fuel metering unit 4. Within the fuel metering unit 4 the governor signal 38 is connected to override the normal demand signal on outputs 32 or 34 from the FADEC. The governor signal acts as an upper threshold level which the FADEC output may not exceed. In normal operating modes this is arranged to be a hard limit, that is, it is independent of engine performance or other transient conditions and does not vary.

In accordance with the present invention the signal level of governor output 38 is selectively variable dependent upon the position of the pilot's lever 14. Thus, as the pilot's lever is moved towards a low speed demand setting the output signal level at 38 is to be correspondingly decreased so that the fuel flow rate limit of metering unit 4 is driven down. When the pilot's lever is moved to a higher speed demand setting then the fuel flow limit of the metering unit is raised accordingly. The supervisory limit function is maintained during normal operation unless emergency control is selected by the pilot.

Emergency control selection is carried out by closing a cockpit mounted switch 42 which connects a 28 volt aircraft power supply 44 to energise a relay coil 46. The relay coil operates to close three sets of normally open relay contacts 48,50,52. The first set of contacts 48 connect the 28 volt supply voltage to an ENABLE input 54 to the modified governor circuit 36. The purpose of input 54 will be described in more detail below. The second and third contacts 50,52 are connected in series with FADEC outputs 32,34 and act to break their connections to fuel metering unit 4. The emergency circuit also includes a connection 56 between FADEC unit 12 and governor 36 carrying the pilot's lever angle signal. This latter connection is not switched but is barred within governor 36 by absence of a signal on the ENABLE input 54.

Figure 2:
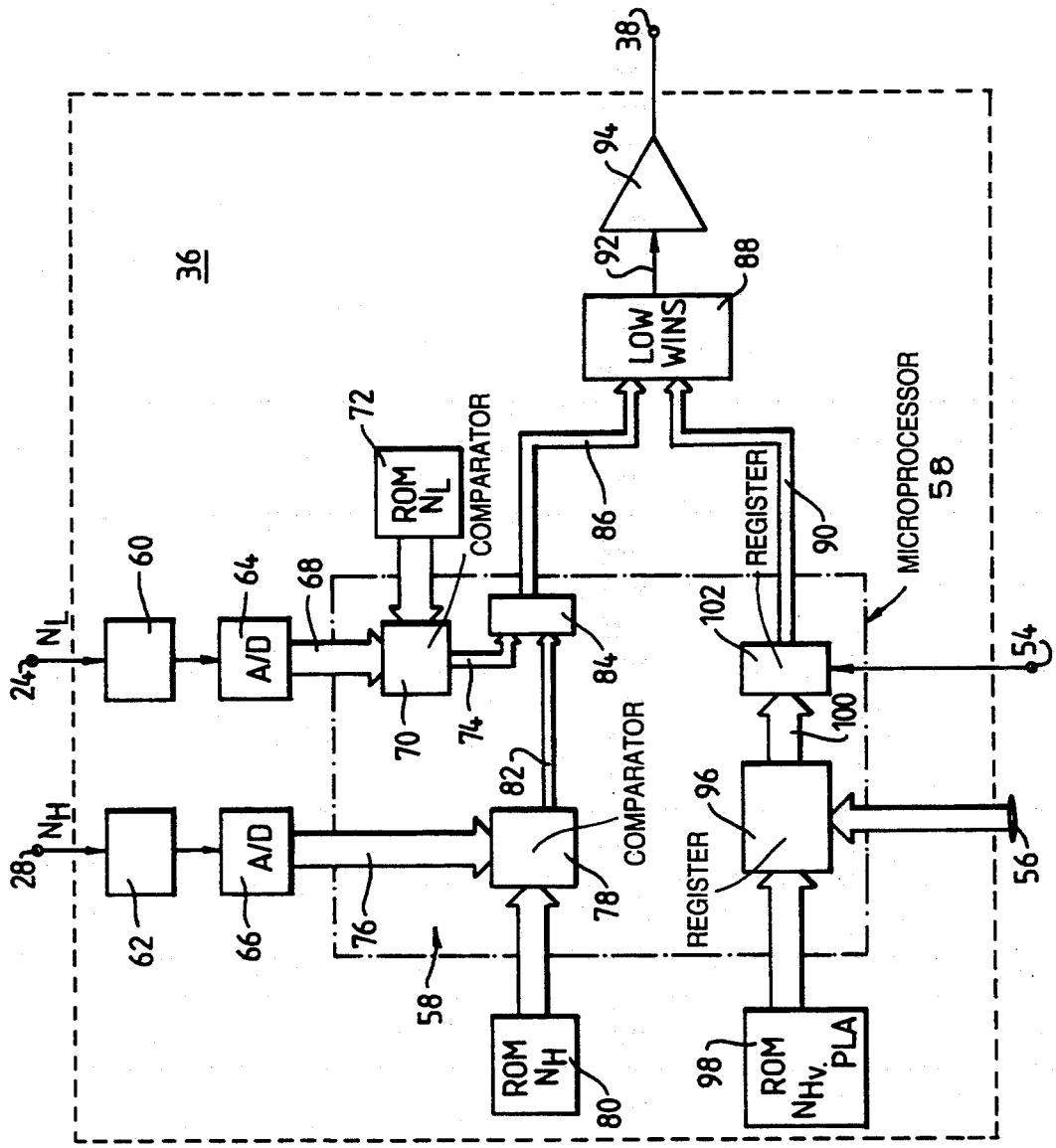
FIG. 2 shows a block diagram of the modified overspeed governor.

FIG. 2 of the drawings shows the governor in greater detail. The heart of the governor 36 comprises a microprocessor 58 which interfaces with read only memories, such as 72, 80, and 98, containing fixed datums or schedules. Speed signals 24,28 are received into different channels in the governor via signal conditioning circuits 60,62 and digital to analogue converters 64,66 respectively. The digitised signal 68 representing low pressure shaft speed $N_L$ is compared, as represented at block 70, by processor 58 with a shaft speed datum value stored in a read only memory (ROM) 72. Comparator 70 produces no control output at 74 if signal 68 is less than the datum value at 72. If the value of signal 68 is equal to or exceeds the datum value then a control signal is produced at 74.

The digitised output signal 76 from A/D converter 66 representing high pressure shaft speed $N_H$ is compared by comparator 78 with an HP shaft speed datum stored in read only memory 80. If signal 76 is less than the stored datum value comparator 78 produces no output. If the signal value is equal to or exceeds the datum value then an error signal is produced at 82.

Normally since both shaft speeds will be less than their respective rated maximum speeds there is no signal at either 74 or 82 and circuit 84 produces no control output. However, if either shaft reaches its maximum permitted speed a control output 86 is required to command a reduction in fuel supply level. Thus, circuit 84 is effectively a logical OR-gate passing-on the error signal commanding the lowest fuel flow rate.

The control output 86 passes to a lowest wins circuit 88 where it is gated with another error signal 90. The signal 90 is present when emergency engine speed control is selected. That is, a variable level signal is present at 90 when emergency control is selected otherwise, during normal, fault-free operation the signal 90 is latched to a high value. The output 92 of lowest wins circuit 88 is supplied to a drive amplifier 94 which provides the fuel metering unit signal at 38.

The digitised pilot's lever angle signal 56 is loaded into a register 96 and is used by microprocessor 58 to access a fuel schedule stored in read only memory (ROM) 98. The table of values stored in ROM 98 are determined by the operational relationship between engine speed, usually HP shaft speed, against pilot's lever angle. The values obtained are linearly proportional to the fuel flow rate required for a demanded engine speed. The passage of output signal 100 read from ROM 98 to lowest wins circuit 88 is controlled by ENABLE signal 54 operating on register 102. In the absence of a voltage on ENABLE line 54 register 102 cannot pass-on the signal 100, the register or gate 102 is therefore arranged to latch the signal 90 to a high value so as to ensure it will not override the normal governor control signal 86. When the ENABLE voltage is present, however, whatever signal is read-out from ROM 98 is passed to input 90 of circuit 88.

In normal operation, emergency control selection switch 42 is open. Thus, contacts 48 are open and there is no ENABLE signal at 54 but switches 50,52 in the FADEC twin lane outputs are closed. Therefore, fuel metering unit 4 is controlled by one of the twin FADEC outputs in accordance with normal operational protocols. These include procedures to be adopted when one of the control lanes is judged faulty. Basically, one of the lanes is selected as the normal control loop with the alternate operating as back-up. In the event of a twin failure it would be expected that the FADEC outputs would latch to maximum output, the engine would accelerate up to the governor limit. Thereafter it would continue to operate at the governor limit until such time as the pilot chooses to shut-down the engine. With the invention he has an alternative.

Closing the emergency switch 42 energises relay coil 46 throwing switches 48,50 and 52. FADEC control of fuel metering unit 4 is therefore interrupted while an ENABLE signal is applied to line 54. The signal from ROM 98 representing the basic fuel demand corresponding to the current position of the pilot's speed lever is allowed to pass through inhibit register 102 to reach lowest wins circuit 88. Assuming the commanded engine speed is less than an intervention speed invoked by the governor inputs 28,24 the signal will be passed to the fuel metering unit 4. Should the pilot change the speed lever angle the digital signal on line 56 will increase or decrease accordingly. Consequently the fuel schedule signal will rise or fall as determined by the schedule stored in ROM 98. In this manner the pilot is able to regain rudimentary control of engine speed in circumstances where, prior to the invention, he would have no control other than to shut-down the engine in question.

I claim:

1. An aircraft engine control system comprising:
   engine speed or thrust demand signal generating means for generating an engine speed or thrust demand signal,
   a main engine control unit connected to receive said generated engine speed or thrust demand signal and to compute and output, in accordance with normal operating schedules, a fuel level signal at a level commensurate with said generated engine speed or thrust demand signal and signals relating to current engine performance,
   a fuel metering unit connected between a source of fuel and the engine to deliver to the engine fuel at a flow rate determined by the fuel level signal, engine speed governor means operable in the event of a failure or a malfunction of the main engine control unit to limit the fuel flow rate delivered by the fuel metering unit, and an emergency control system selectively operable to receive the generated engine speed or thrust demand signal and to vary the fuel flow rate set by the engine speed governor means to produce a fuel flow rate in accordance with a measured engine speed signal and the generated engine speed signal.

2. An aircraft engine control system as claimed in claim 1 wherein the emergency control system is operative to enable modified engine speed governor operation and simultaneously to disable control of the main engine control unit.

3. An aircraft engine control system as claimed in claim 2 wherein the emergency control system is operative to disconnect the fuel level signal outputs of the main engine control unit.

4. An aircraft engine control system as claimed in claim 1 wherein the emergency control system is energized by manual selection means.

5. An aircraft engine control system as claimed in claim 4 wherein the manual selection means is installed in the pilot's cockpit.

6. An aircraft engine control system as claimed in claim 5 wherein the manual selection means is connected to energize a self-latching relay circuit means for disconnecting the main engine control unit output and to enable emergency control system operation.

7. An aircraft engine control system as claimed in claim 1 wherein the emergency control system comprises a digital system including means for storing a schedule representing fuel flow level against demanded engine speed.

8. An aircraft engine control system as claimed in claim 7 wherein said schedule is stored in read only memory.

9. An aircraft engine control system as claimed in claim 8 wherein an output from said read only memory is gated by gating means operated by a latching signal generated by a self-latching relay circuit means. means for disconnecting the main engine control unit output and to enable emergency control system operation.

10. An aircraft engine control system as claimed in claim 9 wherein the gated read only memory output and an output from the engine speed governor means are compared by a lowest wins selection means to provide the varied fuel flow rate.

* * * * *